US011820053B2

(12) United States Patent
Ren et al.

(10) Patent No.: US 11,820,053 B2
(45) Date of Patent: Nov. 21, 2023

(54) EFFICIENT METHOD FOR PREPARING HIGHLY-DIRECTIONAL HIGHLY-DENSE TWO-DIMENSIONAL MATERIAL FILM

(71) Applicant: Institute of Metal Research Chinese Academy of Sciences, Shenyang (CN)

(72) Inventors: Wencai Ren, Shenyang (CN); Jing Zhong, Shenyang (CN); Huiming Cheng, Shenyang (CN)

(*) Notice: Subject to any disclaimer, the term of this patent is extended or adjusted under 35 U.S.C. 154(b) by 583 days.

(21) Appl. No.: 16/765,861

(22) PCT Filed: Nov. 14, 2018

(86) PCT No.: PCT/CN2018/115292
§ 371 (c)(1),
(2) Date: May 20, 2020

(87) PCT Pub. No.: WO2019/100974
PCT Pub. Date: May 31, 2019

(65) Prior Publication Data
US 2020/0361126 A1   Nov. 19, 2020

(30) Foreign Application Priority Data

Nov. 21, 2017 (CN) .......................... 201711169870.1

(51) Int. Cl.
*B29C 41/04* (2006.01)
*B29C 41/42* (2006.01)
(Continued)

(52) U.S. Cl.
CPC .......... *B29C 41/042* (2013.01); *B29C 41/003* (2013.01); *B29C 41/22* (2013.01);
(Continued)

(58) Field of Classification Search
CPC .............................................. B29C 41/04–06
See application file for complete search history.

(56) References Cited

U.S. PATENT DOCUMENTS 5,685,417 A * 11/1997 Hasegawa .............. B65G 15/34
198/847
9,248,610 B2 * 2/2016 Fromm ................... B29C 41/22
(Continued)

FOREIGN PATENT DOCUMENTS

CN      105542399 A  *  5/2016
KR    20170007153 A  *  1/2017

*Primary Examiner* — Atul P. Khare
(74) *Attorney, Agent, or Firm* — Novoclaims Patent Services LLC; Mei Lin Wong

(57) ABSTRACT

An efficient method for preparing a highly-directional highly-dense two-dimensional material film. The method comprises: using a circular tube with a smooth inner surface as a casting mold; and pouring a solution containing a two-dimensional material into the mold when the mold rotates at high speed in a circumferential direction, wherein the solution is uniformly coated on the inner surface of the mold by centrifugal force, the centrifugal rotation generating a shearing force that causes the two-dimensional material to be directionally and regularly arranged layer upon layer in a circumferential direction in the solution, and, the centrifugal force facilitates highly-dense accumulation of the two-dimensional material, thereby obtaining a highly-directional highly-dense two-dimensional material film. The method is applicable in the preparation of a variety of two-dimensional materials such as graphene, a composite material film thereof, and a laminated heterostructure film, and greatly improves electrical, thermal, and mechanical properties of a film.

17 Claims, 2 Drawing Sheets

(51) Int. Cl.
*B29C 41/46* (2006.01)
*B29C 41/00* (2006.01)
*B29C 69/00* (2006.01)
*B29C 41/22* (2006.01)
*B29L 7/00* (2006.01)

(52) U.S. Cl.
CPC .............. *B29C 41/42* (2013.01); *B29C 41/46* (2013.01); *B29C 69/001* (2013.01); *B29L 2007/008* (2013.01)

(56) References Cited

U.S. PATENT DOCUMENTS

| | | | |
|---|---|---|---|
| 10,899,047 B2 * | 1/2021 | Garcia-Leiner | B29C 41/003 |
| 2008/0224349 A1 * | 9/2008 | Wang | B29C 41/06 264/241 |
| 2012/0146265 A1 * | 6/2012 | Wu | B29C 41/04 264/463 |
| 2013/0261282 A1 * | 10/2013 | Biedasek | C08J 5/00 528/315 |
| 2016/0023381 A1 * | 1/2016 | Mazabraud | B29C 70/003 264/250 |

* cited by examiner

EFFICIENT METHOD FOR PREPARING HIGHLY-DIRECTIONAL HIGHLY-DENSE TWO-DIMENSIONAL MATERIAL FILM

BACKGROUND OF THE PRESENT INVENTION

Field of Invention

The present invention relates to the field of preparation and application of two-dimensional materials, and in particularly to a new method for preparing highly-directional and highly-dense two-dimensional material film with high efficiency by using a centrifugal casting process.

Description of Related Arts

Due to the unique two-dimensional structural characteristics, two-dimensional materials such as graphene have a variety of excellent physical and chemical properties that are different from their bulk materials. It has broad application prospects in the fields of electronics, optoelectronics, flexible displays, sensing, energy storage, catalysis, separation membranes, thermal management, functional coatings, composite materials and etc. However, the two-dimensional material prepared by chemical exfoliation method is often having a size of only a few microns, so assembling it into a macroscopically controllable macroscopic bulk material is a prerequisite for its application. As we all know, two-dimensional materials have strong anisotropy, and there are huge differences in the physical properties of the in-plane and vertical in-plane directions. Taking graphene as an example, its in-plane electrical conductivity, thermal conductivity and mechanical properties are much higher than those perpendicular to the in-plane direction. Therefore, assembling two-dimensional materials into thin-film materials oriented in a plane and densely packed is beneficial to maintain and give full play to the inherently excellent electrical, thermal and mechanical properties brought about by the two-dimensional structure characteristics of two-dimensional materials.

At present, the commonly used methods for preparing two-dimensional material films mainly include vacuum suction filtration method, blade coating method, spray coating method and layer-by-layer self-assembly method. The film obtained by vacuum suction filtration method and layer-by-layer self-assembly method has better orientation in the two-dimensional materials. However, these two methods have low efficiency and are not suitable for preparing films with greater thickness and large areas. Although the other two methods have high film-forming efficiency, the driving force for driving the directional self-assembly of the two-dimensional material is small and uncontrollable, and the arrangement of the two-dimensional material in the obtained film is chaotic. Especially when these methods are used to prepare two-dimensional materials and polymer composite membranes, the directional self-assembly of the two-dimensional materials is more difficult due to the higher viscosity of the solution. In addition, the density of the film obtained by the above methods still need to be further improved to improve the contact between the two-dimensional materials, so as to maximize the transfer of the intrinsic properties of the micron-sized two-dimensional materials to the macroscopic bulk materials. In summary, in order to improve the performance of two-dimensional material thin films, there is an urgent need to develop a, high-directional and high-density assembly of film-forming technology with high-efficiency to promote the widespread application of two-dimensional materials.

SUMMARY OF THE PRESENT INVENTION

An object of the present invention is to provide a new method for preparing highly-directional and highly-dense two-dimensional material film with high efficiency by using a centrifugal casting process. The centrifugal force is used to uniformly coat the solution containing the two-dimensional material on the inner surface of the mold. In the process of centrifugal rotation, on the one hand, the shear force formed by the relative motion between the liquid layers is used to promote the regular orientation of the two-dimensional nanomaterials in the solution along the circumferential direction, on the other hand, the centrifugal force is used to promote the dense packing of the two-dimensional materials. Accordingly, a highly-directional and highly-dense two-dimensional film is obtained, and the various properties of the film is improved effectively.

The technical solution of the present invention is:

A method of preparing highly-directional and highly-dense two-dimensional material film with high efficiency, the method uses a round tube with a smooth inner surface as a mold for casting; and solution containing two-dimensional material is poured to the mold when the mold rotates in a circumferential direction at high speed so that centrifugal force is used to evenly apply the solution to the inner surface of the mold and a centrifugal rotation process is defined; during the centrifugal rotation process, on one hand, due to a relative motion between different liquid layers, a shearing force which promotes the two-dimensional material in the solution to align layer-by-layer and in a directional order along the circumferential direction, on the other hand, the centrifugal force promotes a high-density accumulation of the two-dimensional material, therefore the highly-directional and highly-dense two-dimensional material film is obtained.

The method of preparing highly-directional and highly-dense two-dimensional material film with high efficiency comprises the specific steps of:

(1) rotation of casting mold: rotating the mold of round tube shape with smooth inner surface around an axis at high speed, a rotation speed of the mold of round tube shape is 100 r/min to 50000 r/min, so as to form a centrifugal force for uniform application of the solution to the inner surface of the mold;

(2) casting the solution containing the two-dimensional material: adding the solution containing the two-dimensional material to an inner surface of the mold which is rotation at high speed so that the solution is applied uniformly on the inner wall of the mold by the centrifugal force, during the centrifugal rotation process, the relative motion between adjacent liquid layers promotes the two-dimensional material in the solution to align layer-by-layer and in a directional order while the centrifugal force promotes the high-density accumulation of the two-dimensional material, the solution containing two-dimensional material has a concentration of 0.1 mg/ml-100 mg/ml;

(3) steam drying: during the centrifugal rotation process, promoting an evaporation of solvent in the film obtained by casting by using auxiliary heating;

(4) stripping of film: using a mechanical stripping method to strip the film off from the inner wall of the mold to obtain the product of highly-directional and highly-dense two-dimensional material film.

The method of preparing highly-directional and highly-dense two-dimensional material film with high efficiency, the material of the mold of round tube shape is selected from one or two or more composite selected from quartz glass, ceramics, polymers, and metals; and the mold has an inner diameter of 50 mm to 1000 mm.

The method of preparing highly-directional and highly-dense two-dimensional material film with high efficiency, the two-dimensional material used is to a material with a thickness of less than 100 nanometers and a lateral dimension to thickness ratio greater than 1, comprising but not limited to one or composite with two or more selected from graphene, graphene oxide, hydrogenated graphene, fluorinated graphene, hexagonal boron nitride, molybdenum disulfide, tungsten disulfide, molybdenum diselenide, tungsten diselenide, black phosphorene, and Mxenes.

The method of preparing highly-directional and highly-dense two-dimensional material film with high efficiency, the method prepared a composite material film of two-dimensional material, and the composite material of the two-dimensional material is one or two or more organic polymer materials or inorganic materials; the organic polymer materials include but are not limited to polyethylene glycol, polyurethane, polydimethysilane, nanocellulose, epoxy, polyethylene or natural rubber, the inorganic materials include but are not limited to different two-dimensional materials, carbon nanotubes, fullerenes, carbon black, nano-nonmetal, nano oxide or nano metal.

The method of preparing highly-directional and highly-dense two-dimensional material film with high efficiency, the solution of the two-dimensional material or its composite material is added to the casting mold by continuous feeding or one-time feeding; during the casting process, the composition and concentration of the solution containing the two-dimensional material are changed as needed to obtain a vertically laminated heterostructure film composed of films of different two-dimensional materials in the thickness direction, or a gradient composite material with a gradually varying content of two-dimensional materials in the thickness direction.

The method of preparing highly-directional and highly-dense two-dimensional material film with high efficiency, the auxiliary heating temperature is 25° C. to 500° C., and preferably 50° C. to 100° C.

The method of preparing highly-directional and highly-dense two-dimensional material films with high efficiency, the film of two-dimensional material or its composite material obtained is directly stripped off from the mold, no damage is caused to the mold and the mold can be re-used repeatedly.

The method of preparing highly-directional and highly-dense two-dimensional material film with high efficiency, the film of two-dimensional material or its composite material obtained has a three-dimensional stereoscopic tubular shape and is cut into a flat film or a ring-shaped, or is cut along a circumferential direction to a complete strip shaped film.

The method of preparing highly-directional and highly-dense two-dimensional material films with high efficiency, the film of the highly direction and high dense two-dimensional material is prepared into a graphical film directly by using templates.

The characteristics and the advantageous effect of the present invention are:

1. In the present invention, the centrifugal force generated during the rotation of the centrifugal casting process can make the solution containing the two-dimensional material uniformly coated on the inner surface of the mold to form a film with a uniform thickness, and the film thickness can be arbitrarily adjusted.
2. In the present invention, the high-speed rotation of the mold drives the liquid to rotate, and the relative displacement between the liquid layers during the rotation can form a shear force which promotes the directional alignment of the two-dimensional nanomaterials in the solution along the circumferential direction so that the two-dimensional materials in the resulting film are regularly aligned layer-by-layer in a directional order along the plane direction, while the centrifugal force promotes a high-density accumulation of the two-dimensional materials.
3. In the present invention, it is possible to adjust the shear stress between the liquid layers and the centrifugal force by changing the rotational speed of the mold and the concentration and viscosity of the solution in order to macro-control the arrangement state and density of two-dimensional nanomaterials in film products, and the mixed solution of two-dimensional materials in a relatively viscous state can still get orderly directional arrangement, thereby a highly-directional and highly-dense two-dimensional material composite film is prepared.
4. The present invention is simple and easy to control. The composition and concentration of the solution containing the two-dimensional material can be changed as needed during the casting process to obtain a vertically laminated heterostructure film composed of films of different two-dimensional materials in the thickness direction, or a gradient composite material with a gradually varying content of two-dimensional materials in the thickness direction.
5. The film product prepared in the present invention is a cylindrical film, and materials with different shapes can be prepared through simple subsequent processing, including strips and fibers, or a graphical film can be directly prepared by using templates.
6. In the film obtained by the present invention, the two-dimensional material is highly oriented and densely packed, therefore, the excellent electrical, thermal and mechanical properties brought by the two-dimensional structural characteristics can be fully reflected in the macro film, which significantly improves the performance of the film.
7. The invention adopts the centrifugal casting process commonly used in the metallurgical industry, which has the advantages of good universality, simple process, easy operation, fast film making speed and easy enlargement, therefore it is possible to realize large-scale, high-efficiency and rapid production of thin films of highly oriented and dense two-dimensional materials and composite materials.

In summary, the present invention adopts a centrifugal casting process to realize the large-scale and highly efficient production of two-dimensional material films with high orientation and high density, composite material films with different two-dimensional materials, composite material films with two-dimensional materials and polymers and other materials, two-dimensional material composite film with gradient distribution of concentration in thickness direction, and vertically laminated heterostructure film composed of films of different two-dimensional materials in the thickness direction, to make full use of the inherent structural performance characteristics of two-dimensional materials, greatly improve the electrical, thermal and mechanical properties of the film, which provide the foundation for its application in the fields of high-performance electrical/thermal conductive films, thermal management materials, high-strength films, electronic/optoelectronic devices, dense energy storage, gas/ion separation membranes, and proton transport membranes.

DETAILED DESCRIPTION OF THE PREFERRED EMBODIMENT

Figure 1:
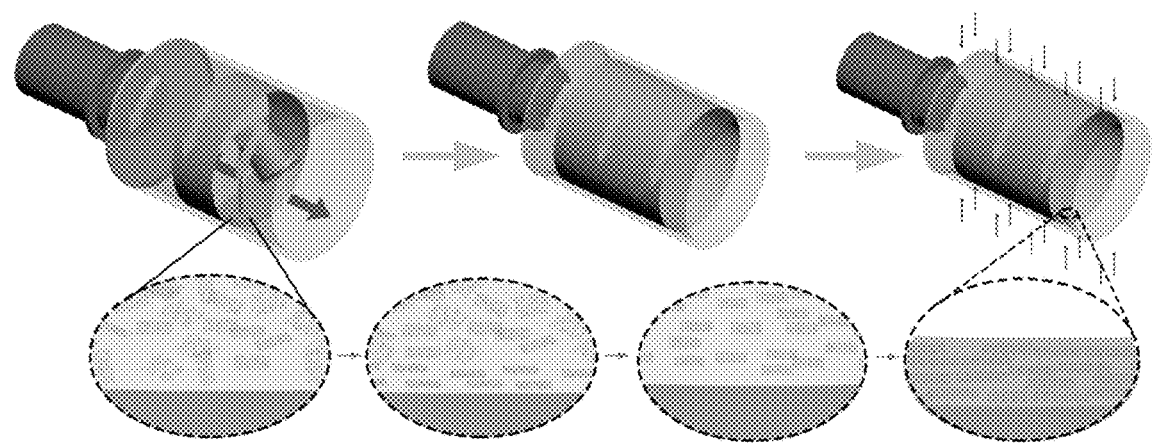
FIG. 1 is a schematic illustration of a centrifugal casting method for preparing highly-directional and highly-dense two-dimensional material film.

Referring to FIG. 1 of the drawings, a process of preparing a highly-directional and highly-dense two-dimensional material thin film by using a centrifugal casting method is as follows:

Use a round tube with a smooth inner surface as a casting mold. When the mold rotates in the circumferential direction (axial direction) at high speed, add the solution containing the two-dimensional material to the mold rotating at high speed, and evenly apply the solution to the inner surface of the casting mold under the action of centrifugal force. In the process of high-speed centrifugal rotation of the solution driven by the mold, due to the relative motion between the different liquid layers, existing pair of displacements between the liquid layers can form the shearing force which promotes two-dimensional materials to align layer-by-layer regularly along the circumferential direction. At the same time, the centrifugal force promotes the high-density accumulation of two-dimensional materials. Therefore, the highly-directional and highly-dense two-dimensional thin film is prepared.

The present invention is described in further detail below with reference to specific embodiments.

Embodiment 1

According to this embodiment, use a quartz glass tube with an inner diameter of 110 mm as a casting mold, set a mold rotation speed to 500 r/min and an auxiliary heating temperature to 80° C. Continuously add a graphene oxide aqueous solution (the average sheet size is about 1 micron and the concentration is 2 mg/ml) to the casting mold. After the solution is evaporated to dryness, a film with a thickness of 3 μm~20 μm is prepared. Cut the film along the axis and then the film is stripped off from the mold to obtain a graphene oxide thin film with a strength of about 90 MPa.

Embodiment 2

The difference from Embodiment 1 is that:

According to this embodiment, use a quartz glass tube with an inner diameter of 110 mm as a casting mold, set a mold rotation speed to 1000 r/min and an auxiliary heating temperature to 80° C. Continuously add a graphene oxide aqueous solution (the average sheet size is about 1 micron and the concentration is 2 mg/ml) to the casting mold. After the solution is evaporated to dryness, a film with a thickness of 3 μm~20 μm is prepared. Cut the film along the axis and then the film is stripped off from the mold to obtain a graphene oxide thin film with a strength of about 125 MPa.

Embodiment 3

The difference from Embodiment 1 is that:

According to this embodiment, use a quartz glass tube with an inner diameter of 110 mm as a casting mold, set a mold rotation speed to 1500 r/min and an auxiliary heating temperature to 80° C. Continuously add a graphene oxide aqueous solution (the average sheet size is about 1 micron and the concentration is 2 mg/ml) to the casting mold. After the solution is evaporated to dryness, a film with a thickness of 3 μm~20 μm is prepared. Cut the film along the axis and then the film is stripped off from the mold to obtain a graphene oxide thin film which is highly-directional and highly-dense of which a strength is further increased to 145 MPa.

Embodiment 4

The difference from Embodiment 1 is that:

According to this embodiment, use a quartz glass tube with an inner diameter of 110 mm as a casting mold, set a mold rotation speed to 500 r/min and an auxiliary heating temperature to 80° C. Continuously add a graphene oxide aqueous solution (the average sheet size is about 1 micron and the concentration is 2 mg/ml) to the casting mold. After the solution is evaporated to dryness, a graphene oxide thin film with a thickness of 3 μm~20 μm is prepared. Then, spray a hydroiodic acid solution with a concentration of 10 wt % onto the surface of the graphene oxide thin film and carry out reduction at 120° C. Finally, cut the thin film along the axis and immerse in water so that the film is stripped off from the mold. Wash repeatedly with deionized water to obtain a graphene thin film with a strength of 170 MPa and a conductivity of 220 S/cm.

Embodiment 5

The difference from Embodiment 1 is that:

According to this embodiment, use a quartz glass tube with an inner diameter of 110 mm as a casting mold, set a mold rotation speed to 1000 r/min and an auxiliary heating temperature to 80° C. Continuously add a graphene oxide aqueous solution (the average sheet size is about 1 micron and the concentration is 2 mg/ml) to the casting mold. After the solution is evaporated to dryness, a graphene oxide thin film with a thickness of 3 μm~20 μm is prepared. Then, spray a hydroiodic acid solution with a concentration of 10 wt % onto the surface of the graphene oxide thin film and carry out reduction at 120° C. Finally, cut the thin film along the axis and immerse in water so that the film is stripped off from the mold. Wash repeatedly with deionized water to obtain a graphene thin film with a strength increased to 250 MPa and a conductivity increased to 390 S/cm.

Embodiment 6

The difference from Embodiment 1 is that:

According to this embodiment, use a quartz glass tube with an inner diameter of 110 mm as a casting mold, set a mold rotation speed to 1500 r/min and an auxiliary heating temperature to 80° C. Continuously add a graphene oxide aqueous solution (the average sheet size is about 1 micron and the concentration is 2 mg/ml) to the casting mold. After the solution is evaporated to dryness, a highly-directional and highly-dense graphene oxide thin film with a thickness of 3 μm~20 μm is prepared. Then, spray a hydroiodic acid solution with a concentration of 10 wt % onto the surface of the graphene oxide thin film and carry out reduction at 120° C. Finally, cut the thin film along the axis and immerse in water so that the film is stripped off from the mold. Wash repeatedly with deionized water to obtain a highly-directional and highly-dense graphene thin film with a strength further increased to 290 MPa and a conductivity increased to 470 S/cm.

Embodiment 7

The difference from Embodiment 1 is that:

According to this embodiment, use a quartz glass tube with an inner diameter of 110 mm as a casting mold, set a mold rotation speed to 1500 r/min and an auxiliary heating temperature to 80° C. Continuously add a graphene oxide aqueous solution (the average sheet size is about 20 micron and the concentration is 2 mg/ml) to the casting mold. After the solution is evaporated to dryness, a highly-directional and highly-dense graphene oxide thin film with a thickness of 3 μm~20 μm is prepared. Then, spray a hydroiodic acid solution with a concentration of 10 wt % onto the surface of the graphene oxide thin film and carry out reduction at 120° C. Finally, cut the thin film along the axis and immerse in water so that the film is stripped off from the mold. Wash repeatedly with deionized water to obtain a highly-directional and highly-dense graphene thin film with a strength further increased to 600 MPa and a conductivity increased to 600 S/cm.

Embodiment 8

The difference from Embodiment 1 is that:

According to this embodiment, use a casting mold, which is selected from a quartz glass tube, a ceramic tube, a polymer plastic tube or a metal tube, with an inner diameter of 50 mm to 1000 mm, set a mold rotation speed to 500 r/min to 2500 r/min and an auxiliary heating temperature to 80° C. Continuously add a graphene oxide aqueous solution (the concentration is 2 mg/ml~10 mg/ml) to the casting mold. After the solution is evaporated to dryness, a film with a thickness of 3 μm~20 μm is prepared. Cut the film along the axis and then the film is stripped off from the mold to obtain a graphene oxide thin film.

Embodiment 9

The difference from Embodiment 1 is that:

According to this embodiment, use a quartz glass tube with an inner diameter of 110 mm as a casting mold, set a mold rotation speed to 1500 r/min and an auxiliary heating temperature to 80° C. Continuously add a graphene oxide aqueous solution (the concentration is 2 mg/ml) to the casting mold. After the solution is evaporated to dryness, a thin film with a thickness of 3 μm~20 μm is prepared. Cut the thin film along the axis and then the film is stripped off from the mold to obtain a highly-directional and highly-dense graphene oxide thin film ring.

Embodiment 10

The difference from Embodiment 1 is that:

According to this embodiment, use a quartz glass tube with an inner diameter of 110 mm as a casting mold, set a mold rotation speed to 1500 r/min and an auxiliary heating temperature to 80° C. Continuously add a graphene oxide aqueous solution (the concentration is 2 mg/ml) to the casting mold. After the solution is evaporated to dryness, a thin film with a thickness of 3 μm~20 μm is prepared. Cut the thin film along the spiral line, set the rotation speed of the mold during cutting to 35 r/min and the advancing speed of the cutting tool to 8 mm/min, then to obtain a complete strip of highly-directional and highly-dense graphene oxide thin film.

Embodiment 11

The difference from Embodiment 1 is that:

According to this embodiment, use a quartz glass tube with an inner diameter of 110 mm as a casting mold, set a mold rotation speed to 1200 r/min and an auxiliary heating temperature to 80° C. Mix a graphene oxide aqueous solution (concentration is 5 mg/ml) and Sodium dodecyl sulfate (SDS) solution of single-walled carbon nanotubes (concentration 1.2 wt %) together, where a mass ratio of graphene oxide to single-walled carbon nanotube is 4:1. Then, continuously add the mixture to the casting mold. After the solution is evaporated to dryness, a thin film of composite film of graphene oxide and single-walled carbon nanotube with a thickness of 3 μm~20 μm is prepared. Then, spray a hydroiodic acid solution with a concentration of 10 wt % onto the surface of the composite film and carry out reduction of the graphene oxide in the composite film at 120° C. Finally, cut the composite film along the axis and immerse in water so that the film is stripped off from the mold. Wash repeatedly with deionized water to obtain a highly-directional and highly-dense composite film of graphene and single-walled carbon nanotube with a density of 1.5 g/cm$^3$, a strength of 105 MPa, a conductivity of 168 S/cm and a specific surface area less than 1 m$^2$/g. Cut this hybrid film into strips to use as electrode for making the all-solid supercapacitors in which a volume capacity and a mass capacity are 193 F/cm³ and 128 F/g respectively.

Embodiment 12

The difference from Embodiment 1 is that:

According to this embodiment, use a quartz glass tube with an inner diameter of 110 mm as a casting mold, set a mold rotation speed to 1200 r/min and an auxiliary heating temperature to 80° C. Mix a graphene oxide aqueous solution (concentration is 5 mg/ml) and SDS solution of single-walled carbon nanotubes (concentration 1.2 wt %) together, where a mass ratio of graphene oxide to single-walled carbon nanotube is 2:1. Then, continuously add the mixture to the casting mold. After the solution is evaporated to dryness, a thin film of composite film of graphene oxide and single-walled carbon nanotube with a thickness of 3 μm~20 μm is prepared. Then, spray a hydroiodic acid solution with a concentration of 10 wt % onto the surface of the composite film and carry out reduction of the graphene oxide in the composite film at 120° C. Finally, cut the composite film along the axis and immerse in water so that the film is stripped off from the mold. Wash repeatedly with deionized water to obtain a highly-directional and highly-dense composite film of graphene and single-walled carbon nanotube with a density of 1.18 g/cm³, a strength of 78 MPa, a conductivity of 163 S/cm and a specific surface area less than 50 m²/g. Cut this hybrid film into strips to use as electrode for making the all-solid supercapacitors in which a volume capacity and a mass capacity are 224 F/cm³ and 190 F/g respectively.

Embodiment 13

The difference from Embodiment 1 is that:

According to this embodiment, use a quartz glass tube with an inner diameter of 110 mm as a casting mold, set a mold rotation speed to 1200 r/min and an auxiliary heating temperature to 80° C. Mix a graphene oxide aqueous solution (concentration is 5 mg/ml) and SDS solution of single-walled carbon nanotubes (concentration 1.2 wt %) together, where a mass ratio of graphene oxide to single-walled carbon nanotube is 1:1. Then, continuously add the mixture to the casting mold. After the solution is evaporated to dryness, a thin film of composite film of graphene oxide and single-walled carbon nanotube with a thickness of 3 μm~20 μm is prepared. Then, spray a hydroiodic acid solution with a concentration of 10 wt % onto the surface of the composite film and carry out reduction of the graphene oxide in the composite film at 120° C. Finally, cut the composite film along the axis and immerse in water so that the film is stripped off from the mold. Wash repeatedly with deionized water to obtain a highly-directional and highly-dense composite film of graphene and single-walled carbon nanotube with a density of 1.06 g/cm³, a strength of 47 MPa, a conductivity of 158 S/cm and a specific surface area less than 141 m²/g. Cut this hybrid film into strips to use as electrode for making the all-solid supercapacitors in which a volume capacity and a mass capacity are 414 F/cm³ and 391 F/g respectively.

Embodiment 14

The difference from Embodiment 1 is that:

According to this embodiment, use a quartz glass tube with an inner diameter of 110 mm as a casting mold, set a mold rotation speed to 500 r/min and an auxiliary heating temperature to 80° C. In this embodiment, the solution is a mixed solution of graphene oxide aqueous solution and water-soluble polyurethane; in the mixed solution, the concentration of graphene oxide is 10 mg/ml, and the concentration of polyurethane is 10 mg/g. Add the mixed solution to the casting mold at one time. After the solution is evaporated to dryness, a thin film with a thickness of 3 μm~20 μm is prepared. Cut the thin film along the axis and then the film is stripped off from the mold to obtain a composite thin film of directional graphene oxide and polyurethane.

Embodiment 15

The difference from Embodiment 1 is that:

According to this embodiment, use a quartz glass tube with an inner diameter of 110 mm as a casting mold, set a mold rotation speed to 500 r/min and an auxiliary heating temperature to 80° C. In this embodiment, the solution is a mixed solution of graphene oxide aqueous solution and water-soluble polyurethane; in the mixed solution, the concentration of graphene oxide is 10 mg/ml, and the concentration of polyurethane is 10 mg/g. Add the mixed solution to the casting mold at one time. After the solution is evaporated to dryness, a thin film with a thickness of 3 μm~20 μm is prepared. Cut the thin film along the axis and then the film is stripped off from the mold to obtain a composite thin film of directional graphene oxide and polyurethane. Finally, place the composite film in an oven at 200° C. for 2 hours for reduction. The in-plane and vertical electrical conductivity are 0.3 S/m and 0.007 S/m, respectively.

Embodiment 15

The difference from Embodiment 1 is that:

According to this embodiment, use a quartz glass tube with an inner diameter of 110 mm as a casting mold, set a mold rotation speed to 1500 r/min and an auxiliary heating temperature to 80° C. In this embodiment, the solution is a mixed solution of graphene oxide aqueous solution and water-soluble polyurethane; in the mixed solution, the concentration of graphene oxide is 10 mg/ml, and the concentration of polyurethane is 10 mg/g. Add the mixed solution to the casting mold at one time. After the solution is evaporated to dryness, a thin film with a thickness of 3 μm~20 μm is prepared. Cut the thin film along the axis and then the film is stripped off from the mold to obtain a composite thin film of highly-directional graphene oxide and polyurethane. Finally, place the composite film in an oven at 200° C. for 2 hours for reduction. The in-plane and vertical electrical conductivity are 0.36 S/m and 0.002 S/m, respectively.

Embodiment 16

The difference from Embodiment 1 is that:

According to this embodiment, use a quartz glass tube with an inner diameter of 110 mm as a casting mold, set a mold rotation speed to 1000 r/min and an auxiliary heating temperature to 80° C. In this embodiment, an aqueous solution of other two-dimensional nanomaterials (such as: hexagonal boron nitride, molybdenum disulfide, tungsten disulfide, molybdenum diselenide, tungsten diselenide, black phosphorene, Mxenes, montmorillonite, etc.) is selected and the solution concentration is 1 mg/g to 10 mg/g. Continuously add the solution to the casting mold. After the solution is evaporated to dryness, a thin film with a thickness of 3 μm~20 μm is prepared. Cut the thin film along the axis and then the film is stripped off from the mold to obtain a highly-directional and highly-dense two-dimensional material film.

Embodiment 18

The difference from Embodiment 1 is that:

According to this embodiment, use a quartz glass tube with an inner diameter of 110 mm as a casting mold, set a mold rotation speed to 1000 r/min and an auxiliary heating temperature to 80° C. In this embodiment, a mixed aqueous solution of two-dimensional materials (such as two or more of: graphene, graphene oxide, hydrogenated graphene, fluorinated graphene, hexagonal boron nitride, molybdenum disulfide, tungsten disulfide, molybdenum diselenide, tungsten diselenide, black phosphorene, Mxenes, montmorillonite) is selected and the solution concentration is 1 mg/g to 10 mg/g. Continuously add the solution to the casting mold. After the solution is evaporated to dryness, a thin film with a thickness of 3 μm~20 μm is prepared. Cut the thin film along the axis and then the film is stripped off from the mold to obtain a highly-directional and highly-dense mixed two-dimensional material film.

Embodiment 19

The difference from Embodiment 1 is that:

According to this embodiment, use a quartz glass tube with an inner diameter of 110 mm as a casting mold, set a mold rotation speed to 1000 r/min and an auxiliary heating temperature to 80° C. In this embodiment, an aqueous solution of other two-dimensional nanomaterials (such as: hexagonal boron nitride, molybdenum disulfide, tungsten disulfide, molybdenum diselenide, tungsten diselenide, black phosphorene, Mxenes, montmorillonite, etc.) is selected and the solution concentration is 1 mg/ml to 10 mg/ml. Continuously add the solution to the casting mold. After the solution is evaporated to dryness, a thin film with a thickness of 3 μm~20 μm is prepared. Cut the thin film along the spiral line, set the rotation speed of the mold during cutting to 35 r/min and the advancing speed of the cutting tool to 8 mm/min, then to obtain a complete strip of highly-directional and highly-dense two-dimensional material thin film.

Embodiment 20

The difference from Embodiment 1 is that:

According to this embodiment, use a quartz glass tube with an inner diameter of 110 mm as a casting mold, set a mold rotation speed to 1000 r/min and an auxiliary heating temperature to 80° C. In this embodiment, an aqueous solution of different two-dimensional materials (such as: graphene, graphene oxide, hydrogenated graphene, fluorinated graphene, hexagonal boron nitride, molybdenum disulfide, tungsten disulfide, molybdenum diselenide, tungsten diselenide, black phosphorene, Mxenes, montmorillonite) is selected and the solution concentration is 1 mg/ml to 10 mg/ml. Add different solutions successively to the casting mold. After the solution is evaporated to dryness, a laminated heterostructure thin film with a thickness of 3 μm~20 μm is prepared. Cut the thin film along the axis and then the film is stripped off from the mold to obtain a highly-directional and highly-dense mixed two-dimensional material thin film.

Embodiment 21

The difference from Embodiment 1 is that:

According to this embodiment, use a quartz glass tube with a surface covered with a graphic template and with an inner diameter of 110 mm as a casting mold, set a mold rotation speed to 1000 r/min and an auxiliary heating temperature to 80° C. In this embodiment, an aqueous solution of different two-dimensional materials (such as: graphene, graphene oxide, hydrogenated graphene, fluorinated graphene, hexagonal boron nitride, molybdenum disulfide, tungsten disulfide, molybdenum diselenide, tungsten diselenide, black phosphorene, Mxenes, montmorillonite) is selected and the solution concentration is 1 mg/ml to 10 mg/ml. Continuously add the solution to the casting mold. After the solution is evaporated to dryness, remove the graphical template. Cut the thin film along the axis and then the film is stripped off from the mold to obtain a highly-directional and highly-dense two-dimensional material graphical thin film.

Figure 2:
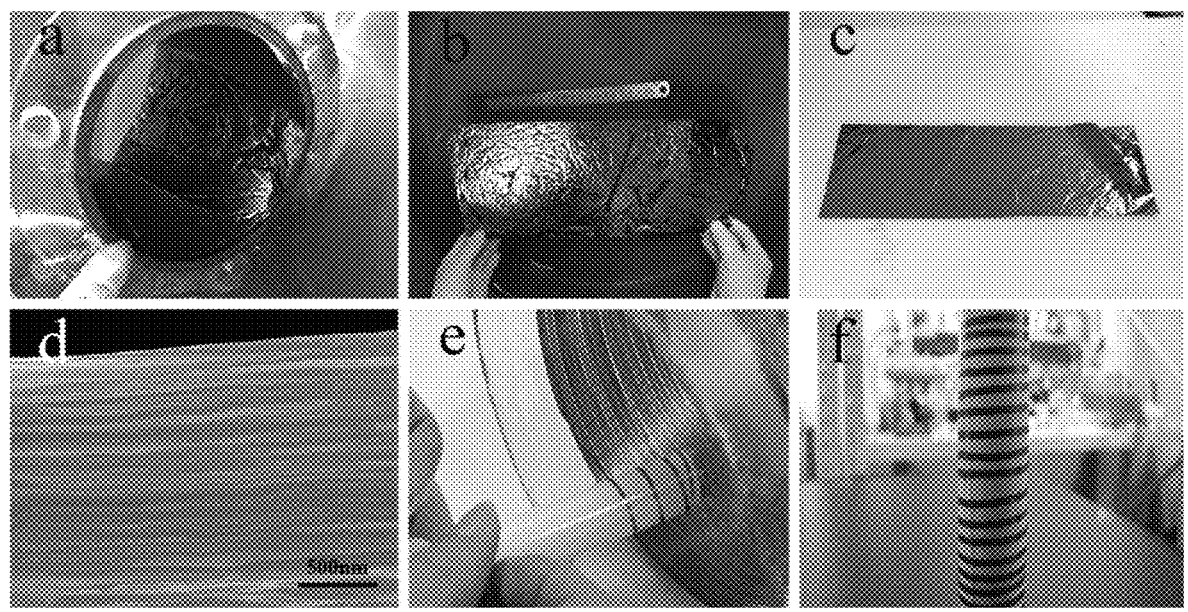
FIG. 2 is an illustration of graphene film prepared from graphene oxide, wherein (a) Graphene film attached to the inner wall of the mold after reduction; (b) Graphene film after peeling in water; (c) Graphene film after drying; (d) Scanning electron microscope image of cross section of graphene film, exhibiting characteristics of highly-directional and highly-dense layered structure; (e) stripping and transfer of processed graphene film with strip shape; (f) graphene film with strip shape on a storage rod.

Referring to FIG. 2 of the drawings, in the graphene film prepared from graphene oxide as raw material, the inner surface feature of the mold replicate is a three-dimensional stereoscopic tubular shape showing a highly-directional, highly-dense, and layered structure, which can be cut into a flat film or cut along the circumferential direction into a complete continuous strip film.

Figure 3:
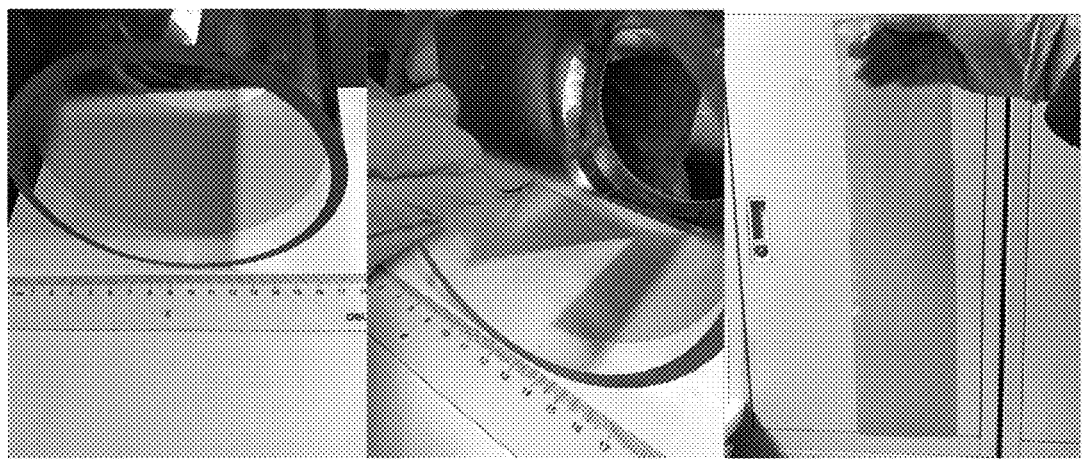
FIG. 3 is a graphene oxide and polyurethane composite film prepared by centrifugal casting process, wherein (a) the composite film of graphene oxide and polyurethane attached to the inner wall of the mold; (b) the peeling of the composite film; (c) the peeled composite film of graphene oxide and polyurethane.

Referring to FIG. 3 of the drawings, which illustrates a composite film of graphene oxide and polyurethane prepared by a centrifugal casting process. The film prepared by centrifugal casting is evenly attached to the inner surface of the mold and can be directly stripped off from the inner surface to obtain the highly-directional composite film of graphene oxide inside.

Figure 4:
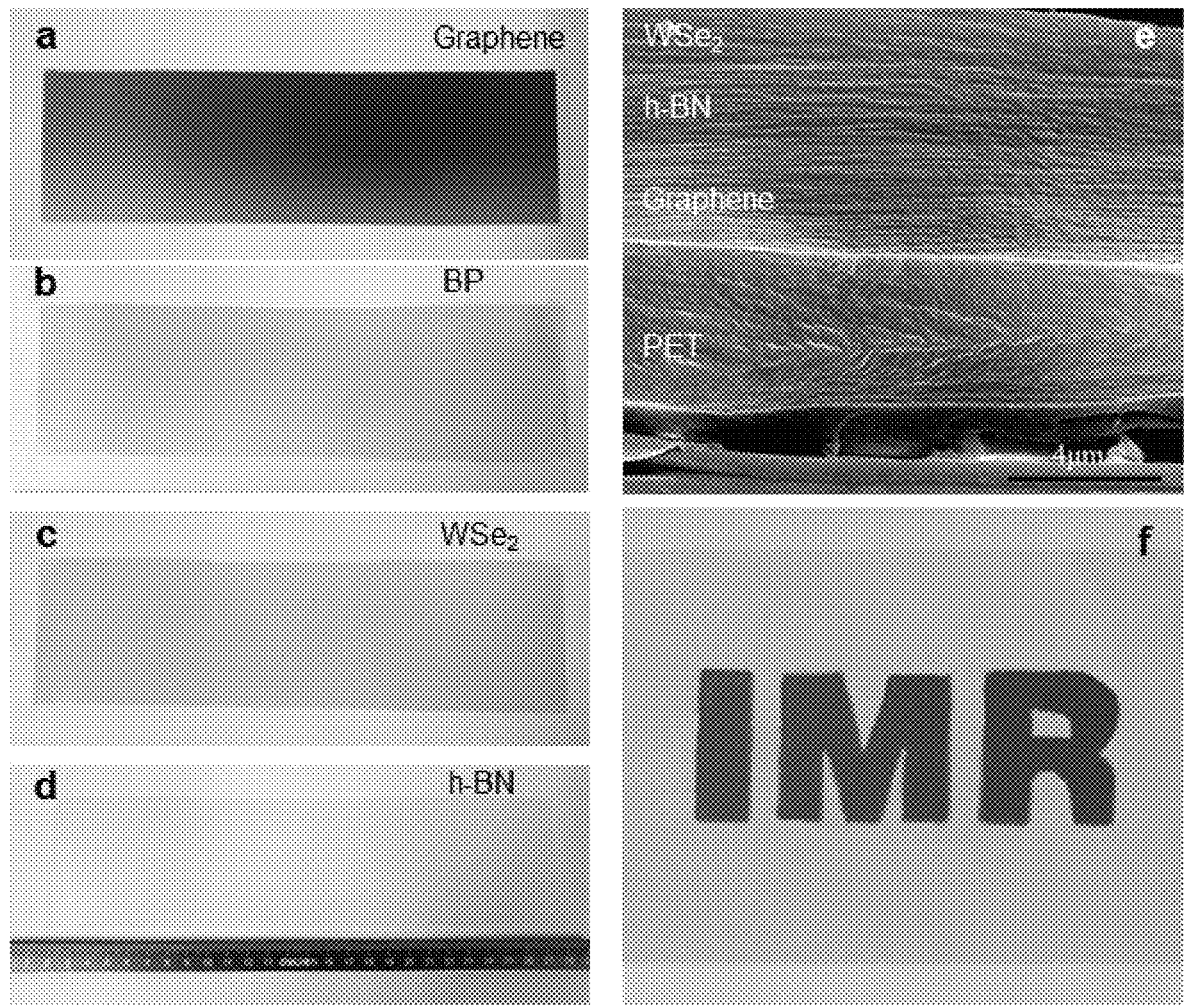
FIG. 4 is various two-dimensional material films and a two-dimensional material heterostructure film prepared by a centrifugal casting process, wherein (a) graphene film; (b) black phosphorus nanosheet film; (c) tungsten diselenide film; (d) hexagonal boron nitride film; (e) scanning electron microscope image of the cross-section of vertically laminated heterostructure film of graphene/hexagonal/boron nitride/tungsten diselenide, in which all two-dimensional materials exhibit highly-directional and highly-dense layered structure characteristics; (f) Graphic graphene film prepared using IMR as a template.

Referring to FIG. 4 of the drawings, the centrifugal casting process can be used to prepare a variety of two-dimensional material films and vertical heterostructure films composed of different two-dimensional material films. The two-dimensional material in the film exhibits characteristics of highly-directional, highly-dense and layered structure, and can be fit for graphical realization.

The results of the embodiments show that the method of the present invention is highly versatile and applicable for the preparation of various two-dimensional materials such as graphene, and their composite films and laminated heterostructure films; greatly improve the electrical, thermal and mechanical properties of thin films; and can be used in the fields such as high-performance conductive/thermal conductive films, thermal management materials, high-strength films, electronic/optoelectronic devices, dense energy storage, gas/ion separation membranes, and proton transport membranes.

The above results show that the preparation process of the graphene oxide of the present invention is simple and easy to control, is capable of realizing continuous production, has high yield of graphene oxide, high single-layer rate, and does not require the introduction of any metal impurities, thereby having a great application value.

What is claimed is:

1. A method of preparing highly-directional and highly-dense two-dimensional material thin film with high efficiency, comprising the steps of: (a) providing a round tube having an inner wall with a smooth inner surface as a mold for casting; (b) pouring a solution containing two-dimensional material into the mold for casting while subjecting the mold to rotation in a circumferential direction thereof and at high speed so as to impart a centrifugal force causing the solution to form a plurality of layers and become evenly applied to the inner surface of the mold; wherein a shearing force resulting from a relative motion between different layers of the solution in the centrifugal rotation process causes the two-dimensional material in the solution to align layer-by-layer and in a directional order along the circumferential direction, and the centrifugal force causes a high-density accumulation of the two-dimensional material so as to form the highly-directional and highly-dense two-dimensional material film.

2. The method of preparing highly-directional and highly-dense two-dimensional material film with high efficiency according to claim 1, further comprising the specific steps of:
   (1) rotating the mold around an axis at the high speed of 100 r/min to 50000 r/min, so as to form the centrifugal force for the even application of the solution to the inner surface of the mold;
   (2) adding the solution containing the two-dimensional material with a concentration of 0.1 mg/ml-100 mg/ml to an inner portion of the mold while rotating at the high speed so that the solution is applied uniformly on the inner wall of the mold by the centrifugal force, wherein relative motion between adjacent layers of solution causes the two-dimensional material in the solution to align layer-by-layer and in the directional order along the circumferential direction while the centrifugal force causes the high-density accumulation of the two-dimensional material;
   (3) during the centrifugal rotation process, using auxiliary heating to evaporate solvent in the film; and
   (4) using a mechanical stripping method to strip the film off from the inner wall of the mold.

3. The method of preparing highly-directional and highly-dense two-dimensional material film with high efficiency according to claim 2, wherein a material of the mold is selected from the group consisting of quartz glass, ceramics, polymers, and metals, or a composite with two or more from the group consisting of quartz glass, ceramics, polymers, and metals; and the mold has an inner diameter of 50 mm to 1000 mm.

4. The method of preparing highly-directional and highly-dense two-dimensional material film with high efficiency according to claim 2, wherein the auxiliary heating temperature is 25° C. to 500° C.

5. The method of preparing highly-directional and highly-dense two-dimensional material film with high efficiency according to claim 2, wherein the two-dimensional material has a thickness of less than 100 nanometers and a lateral dimension to thickness ratio greater than 1, the two-dimensional material comprising one or a composite with two or more selected from the group consisting of graphene, graphene oxide, hydrogenated graphene, fluorinated graphene, hexagonal boron nitride, molybdenum disulfide, tungsten disulfide, molybdenum diselenide, tungsten diselenide, black phosphorene, and Mxenes.

6. The method of preparing highly-directional and highly-dense two-dimensional material film with high efficiency according to claim 2, wherein the film comprises a composite material-film of the two-dimensional material, and the composite material of the two-dimensional material one or two or more of polyethylene glycol, polyurethane, polydimethysilane, nanocellulose, epoxy, polyethylene, natural rubber, carbon nanotubes, fullerenes, carbon black, nano-nonmetal, nano oxide, and nano metal.

7. The method of preparing highly-directional and highly-dense two-dimensional material film with high efficiency according to claim 2, further comprising the steps of: adding the solution containing the two-dimensional material to the casting mold by continuous feeding or one-time feeding; wherein in the casting process, the composition and concentration of the solution containing the two-dimensional material are changed in order to obtain a vertically laminated heterostructure film, or a gradient composite material with a gradually varying content of two-dimensional materials in the thickness direction of the film.

8. The method of preparing highly-directional and highly-dense two-dimensional material film with high efficiency according to claim 2, further comprising directly stripping off the film from the mold such that no damage is caused to the mold and the mold is reusable.

9. The method of preparing highly-directional and highly-dense two-dimensional material film with high efficiency according to claim 2, wherein the film has a three-dimensional stereoscopic tubular shape; and wherein the method further comprises cutting the film of two-dimensional material obtained into a flat film or a ring-shaped film, or cutting the film along a circumferential direction at one end into a continuous strip shaped film.

10. The method of preparing highly-directional and highly-dense two-dimensional material film with high efficiency according to claim 2, further comprising preparing the film of the highly-directional and highly-dense two-dimensional material into a graphical film directly by using templates.

11. The method of preparing highly-directional and highly-dense two-dimensional material film with high efficiency according to claim 1, wherein the two-dimensional material has a thickness of less than 100 nanometers and a lateral dimension to thickness ratio greater than 1, the two-dimensional material comprising one or a composite with two or more from the group consisting of graphene, graphene oxide, hydrogenated graphene, fluorinated graphene, hexagonal boron nitride, molybdenum disulfide, tungsten disulfide, molybdenum diselenide, tungsten diselenide, black phosphorene, and Mxenes.

12. The method of preparing highly-directional and highly-dense two-dimensional material film with high efficiency according to claim 1, wherein the film comprises a composite material of the two-dimensional material, and the composite material of the two-dimensional material comprises one or two or more of polyethylene glycol, polyurethane, polydimethysilane, nanocellulose, epoxy, polyethylene, natural rubber, carbon nanotubes, fullerenes, carbon black, nano-nonmetal, nano oxide, and nano metal.

13. The method of preparing highly-directional and highly-dense two-dimensional material film with high efficiency according to claim 1, further comprising the steps of: adding the solution containing the two-dimensional material to the casting mold by continuous feeding or one-time feeding; wherein in the casting process, the composition and concentration of the solution containing the two-dimensional material are changed in order to obtain a vertically laminated heterostructure film, or a gradient composite material with a gradually varying content of two-dimensional materials in the thickness direction of the film.

14. The method of preparing highly-directional and highly-dense two-dimensional material film with high efficiency according to claim 1, further comprising directly stripping off the film from the mold such that no damage is caused to the mold and the mold is reusable.

15. The method of preparing highly-directional and highly-dense two-dimensional material film with high efficiency according to claim 1, wherein the film has a three-dimensional stereoscopic tubular shape; and wherein the method further comprises cutting the film into a flat film or a ring-shaped film, or cutting the film along a circumferential direction into a strip shaped film.

16. The method of preparing highly-directional and highly-dense two-dimensional material film with high efficiency according to claim 1, further comprising preparing the film of the highly-directional and highly-dense two-dimensional material into a graphical film directly by using templates.

17. The method of preparing highly-directional and highly-dense two-dimensional material film with high efficiency according to claim 1, wherein the film has a thickness of 3 μm~20 μm.

* * * * *